United States Patent
Lin et al.

(10) Patent No.: US 10,148,461 B2
(45) Date of Patent: Dec. 4, 2018

(54) PREAMBLE DETECTION AND TIME-OF-ARRIVAL ESTIMATION FOR A SINGLE-TONE FREQUENCY HOPPING RANDOM ACCESS PREAMBLE

(71) Applicant: TELEFONAKTIEBOLAGET LM ERICSSON (PUBL), Stockholm (SE)

(72) Inventors: Xingqin Lin, San Jose, CA (US); Yi-Pin Eric Wang, Fremont, CA (US); Ansuman Adhikary, Santa Clara, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 117 days.

(21) Appl. No.: 15/148,691

(22) Filed: May 6, 2016

(65) Prior Publication Data

US 2017/0324587 A1   Nov. 9, 2017

(51) Int. Cl.
| | |
|---|---|
| H04L 1/00 | (2006.01) |
| H04L 25/02 | (2006.01) |
| H04B 1/7136 | (2011.01) |
| H04J 11/00 | (2006.01) |
| H04L 5/00 | (2006.01) |
| H04L 27/26 | (2006.01) |

(Continued)

(52) U.S. Cl.
CPC ....... *H04L 25/0204* (2013.01); *H04B 1/7136* (2013.01); *H04J 11/0023* (2013.01); *H04L 5/0007* (2013.01); *H04L 27/261* (2013.01); *H04L 27/2659* (2013.01); *H04L 27/2662* (2013.01); *H04L 27/2675* (2013.01); *H04W 56/0045* (2013.01); *H04W 74/0833* (2013.01); *H04B 2001/71367* (2013.01); *H04B 2201/71353* (2013.01); *H04L 27/266* (2013.01)

(58) Field of Classification Search
CPC ............ H04W 72/042; H04W 68/005; H04W 52/0216; H04W 52/0229; H04W 76/048; Y02B 60/50
See application file for complete search history.

(56) References Cited

U.S. PATENT DOCUMENTS

| | | | | |
|---|---|---|---|---|
| 5,898,684 A | * | 4/1999 | Currivan ................. | H04L 7/042 370/350 |
| 6,493,380 B1 | * | 12/2002 | Wu .......................... | G01S 5/02 342/417 |

(Continued)

OTHER PUBLICATIONS

Huawei, et al., NB-PRACH design, R1-161357, 3GPP TSG RAN WG1 Meeting #84, St. Julian's, Malta, Feb. 15-19, 2016.

(Continued)

*Primary Examiner* — Clemence S Han

(57) ABSTRACT

A receiver baseband processor and method for performing preamble detection and Time-of-Arrival, ToA, estimation for a single-tone frequency hopping random access preamble. The processor FFT processes a received signal and identifies logical tones. For each logical tone, the processor reads received symbols; determines a ToA estimate; forms a statistic based on the ToA estimate; compares the statistic to a preamble threshold; and when the statistic is greater than or equal to the threshold, determines a preamble is present and utilizes the ToA estimate for a timing advance command.

24 Claims, 13 Drawing Sheets

(51) Int. Cl.
*H04W 56/00* (2009.01)
*H04W 74/08* (2009.01)

(56) References Cited

U.S. PATENT DOCUMENTS

| | | | |
|---|---|---|---|
| 6,510,186 B1* | 1/2003 | Chen | H04L 25/0202 375/343 |
| 8,842,571 B1* | 9/2014 | Yu | H04L 25/26 370/252 |
| 2009/0046792 A1* | 2/2009 | Xu | H04L 25/0204 375/260 |
| 2015/0365975 A1 | 12/2015 | Sahlin et al. | |
| 2017/0325268 A1* | 11/2017 | Liu | H04W 74/0833 |

OTHER PUBLICATIONS

Ericsson, NB-IoT—Single Tone Frequency NB-PRACH Design, R1-160275, 3GPP TSG-RAN1 #84, St. Julian's, Malta, Feb. 15-19, 2016.
Lin, et al., Random Access Preamble Design and Detection for 3GPP Narrowband IoT Systems, May 17, 2016.

\* cited by examiner

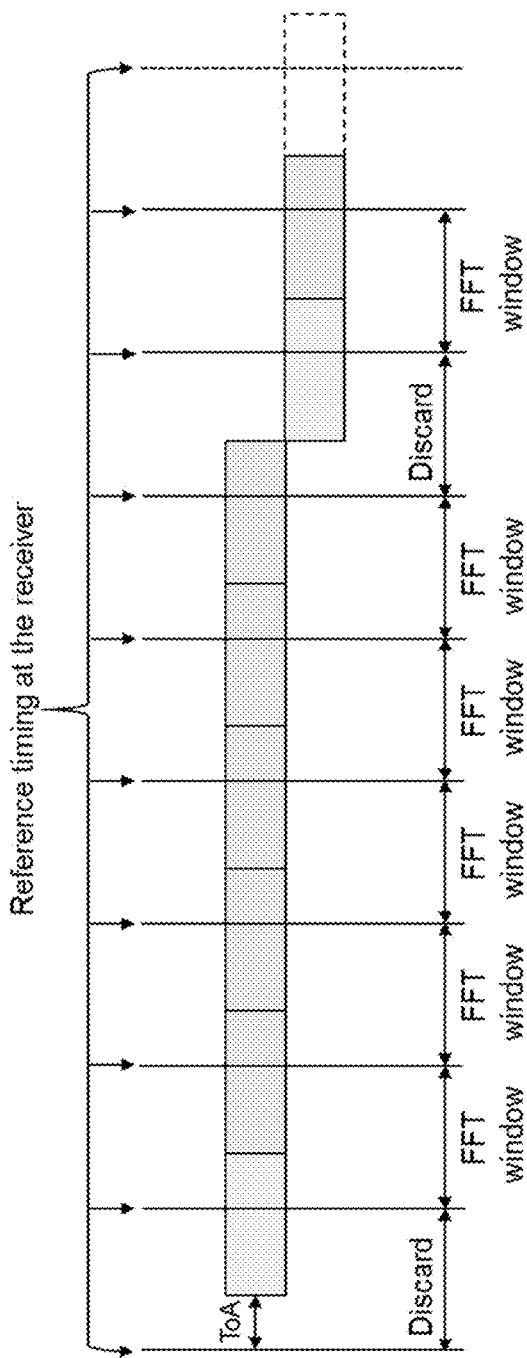

PREAMBLE DETECTION AND TIME-OF-ARRIVAL ESTIMATION FOR A SINGLE-TONE FREQUENCY HOPPING RANDOM ACCESS PREAMBLE

FIELD OF THE DISCLOSURE

The present disclosure generally relates to communication networks, and more particularly to a receiver baseband processor and method for performing preamble detection and time-of-arrival (ToA) estimation for a single-tone frequency hopping random access preamble such as a Narrowband Internet of Things (NB-IoT) Physical Random Access Channel (NPRACH).

BACKGROUND

Narrowband Internet of Things (NB-IoT) is an emerging cellular technology that will provide improved coverage for massive number of low-throughput low-cost devices with low device power consumption in delay-tolerant applications. A new single tone signal with frequency hopping has been designed for NB-IoT Physical Random Access Channel (NPRACH).

The Networked Society and IoT are associated with new requirements on cellular networks with respect to device cost, battery lifetime, and coverage for example. To drive down device and module cost, using a system-on-a-chip (SoC) solution with integrated power amplifier (PA) is highly desirable. However, it is feasible for the current state-of-the-art PA technology to allow 20-23 dBm transmit power when the PA is integrated in a SoC. This constraint limits uplink "coverage", which is related to how much path loss is allowed between a user terminal and a base station. To maximize the coverage achievable by an integrated PA, it is necessary to reduce PA backoff. PA backoff is needed when the communication signal has non-unity, peak-to-average power ratio (PAPR). The higher the PAPR, the higher PA backoff required. Higher PA backoff also gives rise to lower PA efficiency, and thus lower device battery lifetime. Thus, for wireless IoT technologies, designing an uplink communication signal that has as low PAPR as possible is critically important for achieving the performance objectives concerning device cost, battery lifetime, and coverage.

Currently 3GPP is standardizing NB-IoT technologies. There is strong support from the existing Long Term Evolution (LTE) eco-system (vendors and operators) for evolving existing LTE specifications to include the desired NB IoT features. This is motivated by the time-to-market consideration, since a LTE-based NB-IoT solution can be standardized and developed in a shorter time frame. LTE uplink however is based on single-carrier frequency-division multiple-access (SC-FDMA) modulation for the uplink data and control channels, and Zadoff-Chu signal for random access. Neither of these signals has good PAPR properties.

To help solve the above mentioned problems, a new random access preamble signal has been proposed and adopted in 3GPP. The new random access preamble signal is referred to as a single-tone frequency hopping NB-IoT PRACH (NPRACH). (See RAN1 Chairman's Notes, 3GPP TSG RAN WG1 Meeting #84 St Julian's, Malta, 15-19 Feb. 2016.) Generation of the random access preamble signal includes concatenating N preamble symbol groups, each preamble symbol comprising a single tone. NPRACH uses the following hopping pattern, resulting in at least four different subcarrier frequencies. Inner layer fixed-size hopping is applied within every four symbol groups. First level single-subcarrier hopping is used between the first and the second symbol groups and between the third and the fourth symbol groups. Further, the two single-subcarrier hoppings are mirrored, i.e., if the first hopping is "UP", the second hopping is "DOWN", and vice versa. Second level 6-subcarrier hopping is used between the second and the third symbol groups. Outer-layer pseudo-random hopping is applied between groups of four symbol groups.

The new NPRACH signal is single-tone based and has extremely low PAPR, and thus reduces the need for PA backoff to the greatest extent and maximizes PA efficiency. The new NPRACH signal is compatible with SC-FDMA and orthogonal frequency-division multiple-access (OFDMA) as in any OFDM symbol interval, the new NPRACH signal looks like an OFDM signal of one single subcarrier.

In one embodiment, a radio network node such as a base station receives the NPRACH signal from a wireless communication device, and a baseband processor within the radio network node processes the received signal in an attempt to detect a random access preamble that comprises multiple symbol groups, with each of the symbol groups on a single tone during a different time resource, according to a frequency hopping pattern that hops the single tone different frequency distances at different symbol groups, wherein each symbol group comprises one or more symbols.

Note that for a single subcarrier signal, the OFDM signal is identical to the SC-FDMA signal. Further, hopping patterns are carefully designed such that (1) accurate time-of-arrival estimation can be performed by the base station, (2) the frequency resources can be fully utilized by PRACH while maintaining orthogonality of different preambles.

SUMMARY

The new single-tone frequency hopping NPRACH requires new receiver algorithms for preamble detection and time-of-arrival (ToA) estimation. Traditional correlation algorithms for Zadoff-Chu sequence based PRACH in LTE do not apply to NPRACH preamble detection and ToA estimation in NB-IoT. The present disclosure provides receiver algorithms for preamble detection and time-of-arrival estimation for single-tone frequency hopping random access preambles such as the NPRACH design in NB-IoT. The algorithms achieve a very high detection rate, a very low false alarm rate, and an accurate time-of-arrival estimation in NPRACH, which are important for NB-IoT systems to function properly. The algorithms offer different performance and complexity trade-offs, and provide important guidance for the implementation of network equipment such as base stations.

In one embodiment, the disclosure is directed to a method in a baseband processor of a receiver for performing preamble detection and ToA estimation for a single-tone frequency hopping random access preamble. The method includes Fast Fourier Transform (FFT) processing a received signal and identifying logical tones. For each logical tone, the method includes reading received symbols; determining a ToA estimate; forming a statistic based on the ToA estimate; comparing the statistic to a preamble threshold; and when the statistic is greater than or equal to the threshold, determining a preamble is present and utilizing the ToA estimate for a timing advance command.

In another embodiment, the disclosure is directed to a receiver for performing preamble detection and ToA estimation for a single-tone frequency hopping random access preamble. The receiver includes a receiver front end for receiving a radio frequency (RF) signal; and a baseband processor for processing the received RF signal. The baseband processor includes a processing circuit configured to FFT process the received signal and identify logical tones, and for each logical tone, to read received symbols; determine a ToA estimate; form a statistic based on the ToA estimate; compare the statistic to a preamble threshold; and when the statistic is greater than or equal to the threshold, determine a preamble is present and utilize the ToA estimate for a timing advance command.

Further features of the various embodiments are as claimed in the dependent claims. Additional benefits and advantages of the embodiments will be apparent in view of the following description and accompanying Figures.

BRIEF DESCRIPTION OF THE DRAWINGS

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIG. 2 is an illustrative drawing illustrating an example of FFT processing of a received signal as performed in step 11 of FIG. 1;

FIG. 3 is an illustrative drawing of an exemplary PRACH symbol group having five symbols;

DETAILED DESCRIPTION

Figure 1:
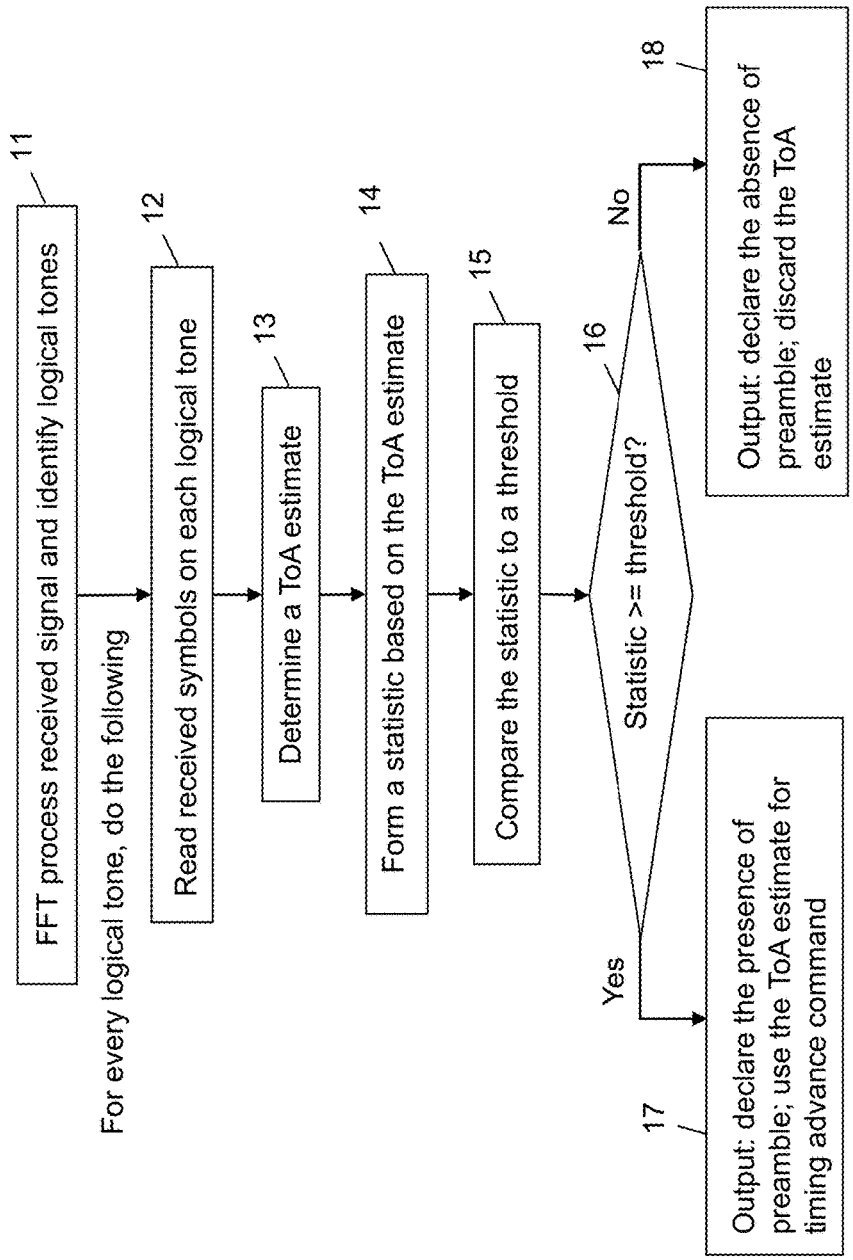
FIG. 1 is a flowchart illustrating an overall method of time-of-arrival (ToA) estimation and preamble detection in an exemplary embodiment of the present disclosure.

The present disclosure provides new receiver algorithms for preamble detection and time-of-arrival (ToA) estimation when using the single-tone frequency hopping NPRACH.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific details.

One or more embodiments of the present patent disclosure may be implemented using different combinations of software and firmware, or hardware. Thus, one or more of the techniques shown in the Figures (e.g., flowcharts) may be implemented using code and data stored and executed on one or more electronic devices or nodes.

In the existing LTE random access design, random access serves multiple purposes such as initial access when establishing a radio link, scheduling requests, and so on. Among others, a main objective of random access is to achieve uplink synchronization, which is important for maintaining the uplink orthogonality in LTE. To preserve orthogonality among different user equipments (UEs) in an OFDMA or SC-FDMA system, the time of arrival (ToA) of each UE's signal needs to be within the cyclic prefix (CP) of the OFDMA or SC-FDMA signal at the base station.

In LTE, random access can be either contention-based or contention-free. The contention-based random access procedure consists of four steps: (1) the UE transmits a Random Access Preamble (PRACH), which is received by an eNodeB (eNB); (2) the eNB transmits a Random Access Response; (3) the UE transmits an access request (Scheduled Transmission); and (4) the eNB resolves any contention and provides an uplink grant. Note that only Step 1 involves physical-layer processing specifically designed for random access, while the remaining Steps 2-4 follow the same physical-layer processing used in uplink and downlink data transmission. For contention-free random access, the UE uses reserved preambles assigned by the base station. In this case, contention resolution is not needed, and thus only Steps 1 and 2 are required.

The NB-IoT PRACH serves similar purposes as in LTE, and reuses the random access procedure in LTE. In Step 1 of the contention-based random access procedure, the PRACH preamble does not occupy the entire random access segment, leaving some time as guard time (GT). For a UE close to the eNB, the GT may follow the preamble. For a UE at the cell edge, the GT may precede the preamble. As discussed earlier, to maximize PA efficiency and coverage, it is desirable to have PRACH preambles as close to constant-envelope as possible. Also, the PRACH preambles should be designed such that accurate time-of-arrival estimation can be performed by the base stations. In the below description, the terms "PRACH signal" and "PRACH preamble" are used interchangeably.

FIG. 1 is a flowchart illustrating an overall method of time-of-arrival (ToA) estimation and preamble detection for a single-tone frequency hopping random access preamble in an exemplary embodiment of the present disclosure. The method may be performed in a baseband processor of a receiver. At step 11, the processor FFT processes a received signal and identifies logical tones. For every logical tone, the processor performs steps 12 through 18. At step 12, received symbols are read on each logical tone. At step 13, a Time of Arrival (ToA) estimate is determined. At step 14 a statistic is formed based on the ToA estimate. At step 15 the statistic is compared to a threshold. At step 16 it is determined whether the statistic is greater than or equal to the threshold. If so, the method moves to step 17 where the processor determines that a preamble is present and utilizes the ToA estimate for a timing advance command. When the statistic is less than the threshold, the method may move instead to step 18 where the processor discards the ToA estimate.

FIG. 2 is an illustrative drawing illustrating an example of FFT processing of a received signal as performed in step 11 of FIG. 1. FFT windows are shown for the processing of a PRACH symbol group consisting of a cyclic prefix (CP) and 5 symbols.

FIG. 3 is an illustrative drawing of one example of the basic structure of a PRACH symbol group 31 having a CP and 5 symbols. The symbol group is basically a single tone OFDM signal. However, unlike a traditional OFDM symbol where the non-CP part consists of a single symbol, the non-CP part of the PRACH symbol group may consist of one or more symbols. Current 3GPP agreements state that one CP (of length either 266.7 µs or 66.7 µs) and five symbols (0, 1, 2, 3, 4) constitute a basic symbol group.

A number of OFDM symbol groups, each one as illustrated in FIG. 3, are concatenated to form a PRACH preamble. But the frequency positions of the symbol groups of the same PRACH preamble vary according to some hopping patterns.

Figure 4:
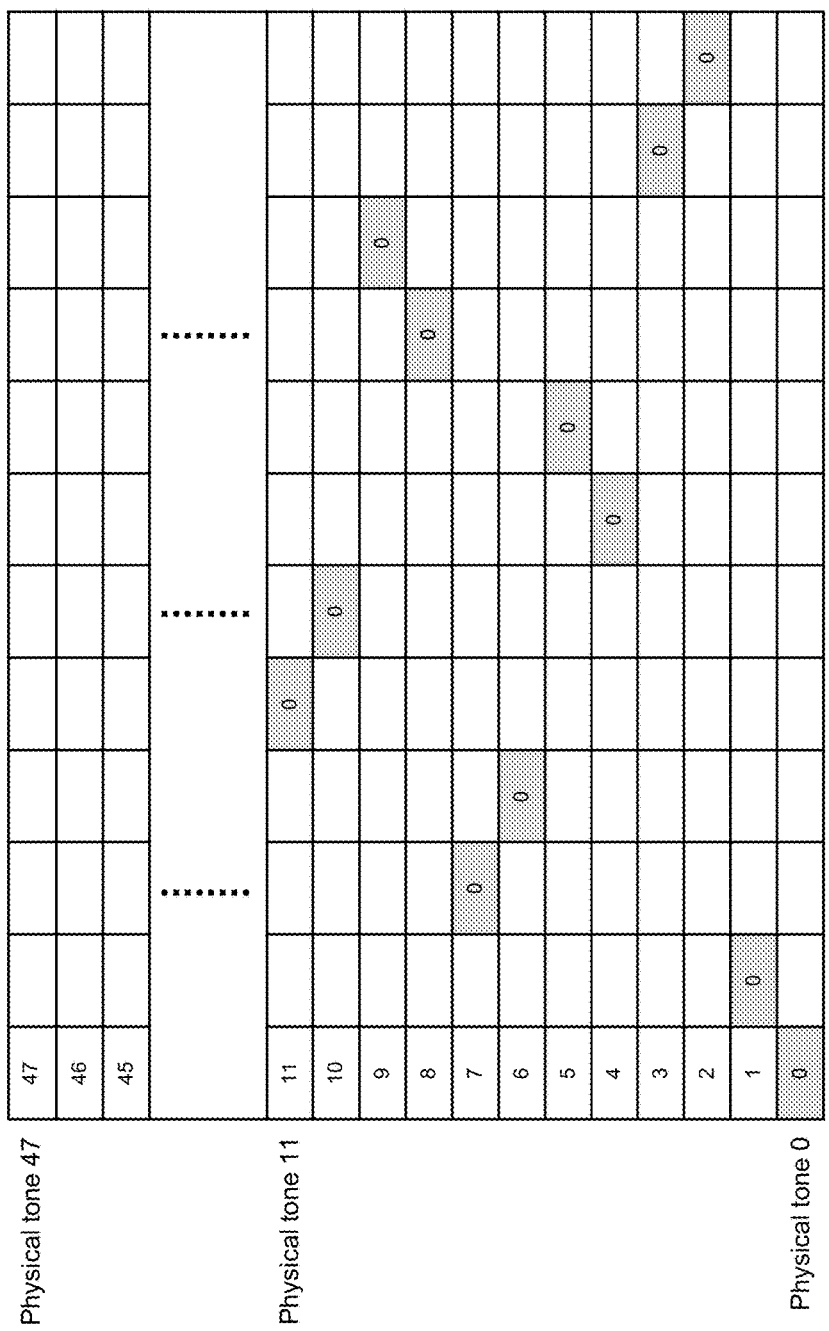
FIG. 4 is an illustrative drawing illustrating an example of a relationship of logical tones to physical tones.

FIG. 4 is an illustrative drawing illustrating an example of a relationship of logical tones to physical tones. The vertical axis indicates the frequency domain where each unit indicates a tone. The horizontal axis indicates the time domain where each unit is one symbol group. Thus, each rectangle indicates a time-frequency position of a symbol group, whose structure is illustrated in FIG. 3. There are 48 physical tones in the figure, and there can be 48 logical tones in the figure. As an example, the figure highlights one logical tone referred to as logical tone "0", while other logical tones are not shown. The rectangles labeled as "0" together constitute the logical tone "0".

Figure 10:
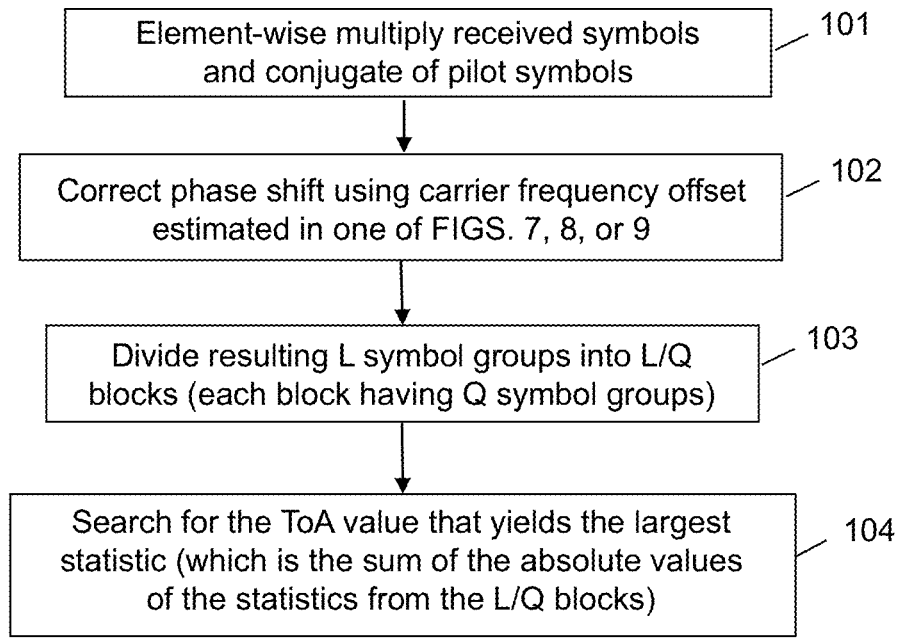
FIG. 10 is a flowchart illustrating a first exemplary embodiment for estimating ToA in step 62 of FIG. 6.
Figure 11:
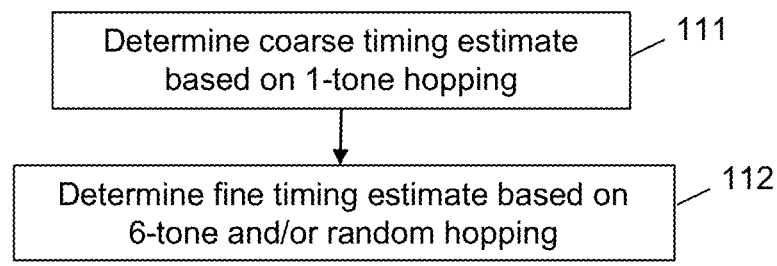
FIG. 11 is a flowchart illustrating a second exemplary embodiment for estimating ToA in step 62 of FIG. 6.

As noted above, the disclosed receiver algorithms for preamble detection and time-of-arrival (ToA) estimation are designed for single-tone frequency hopping random access preambles such as the NPRACH design in NB-IoT. This disclosure focuses on two basic approaches: a receiver algorithm for joint ToA and residual carrier frequency offset estimation (FIG. 5), and a receiver algorithm for two-step ToA estimation with residual carrier frequency offset estimation (FIG. 6). In the two-step algorithm, residual CFO estimation is performed followed by ToA estimation. Three alternatives for residual CFO estimation are described (FIGS. 7-9), and two alternatives for ToA estimation are described (FIGS. 10-11). The alternatives for ToA estimation are (1) direct search based on a maximum likelihood rule (FIG. 10), and (2) a coarse timing estimate based on 1-tone hopping mirroring plus a fine timing estimate based on 6-tone and/or pseudo random hopping (FIG. 11). Details for determining the coarse timing estimate are provided in FIG. 12. Two alternatives for determining the fine timing estimate are provided in FIGS. 13-14. An exemplary embodiment of a receiver configured to perform the method is provided in FIG. 15.

To develop the receiver algorithms for the new NPRACH design, one first needs to understand what the received random access signal looks like from a baseband processor's perspective.

Preliminary Analysis

For simplicity, it is assumed each symbol group only has one symbol for the following analysis. The result will be extended to the symbol group of five symbols below. The continuous baseband equivalent OFDM signal can be written as:

$$s(t) = \sum_m \frac{1}{N} \sum_k S[k;m] e^{j2\pi \frac{k}{T_d}(t-mT_s)} I_{[-T_{cp}, T_d]}(t-mT_s)$$

The notations in the above equation are defined as follows.

N: FFT size
S[k;m]: Symbol on the k-th subcarrier of the m-th OFDM symbol
$T_d$: Duration of the data part of an OFDM symbol
$T_{cp}$: Duration of the CP of an OFDM symbol
$T_s = T_d + T_{cp}$: Duration of an OFDM symbol
$I_A(t)$: Indicator function: it equals 1 if t∈A and 0 otherwise Accordingly, if the continuous waveform is sampled at the OFDM sampling rate, the n-th sample of the m-th OFDM symbol is given by:

$$s[n;m] = s\left(mT_s + n\frac{T_d}{N}\right) = \frac{1}{N} \sum_k S[k;m] e^{j2\pi \frac{k}{N}n},$$

$$n = -N_{cp}, \ldots, N-1 \text{ where } N_{cp} = \frac{T_{cp}}{T_d/N}$$

is the CP length in terms of OFDM samples.

For the transmission of NPRACH, the channel appears flat. More generally, since the system bandwidth of NB-IoT is 180 kHz and NPRACH hopping is further restricted to within 45 kHz bandwidth, the channel can be modelled by a 1-tap channel. Specifically, the channel gain for the n-th sample of the m-th OFDM symbol is modeled as:

$$h[n;m] = a[m]\delta(n-D)$$

where D is the unknown delay to be estimated, and a[m] is channel gain at the m-th OFDM symbol. By design, the CP is long enough to cover the unknown delay, and thus the delay D is less than $N_{cp}$.

Another implicit assumption in the channel model is that the channel is invariant within one OFDM symbol. This is a common assumption for normal OFDM transmissions. If the channel varies within one OFDM symbol, the received OFDM signal will experience inter-channel interference (ICI).

Given the transmitted signal and the channel model, the n-th sample of the m-th OFDM symbol at the receiver is given by:

$$y[n;m] = \frac{a[m]}{N} e^{j2\pi \Delta f(n+m(N+N_{cp}))} \sum_k S[k;m] e^{j2\pi \frac{k}{N}(n-D)} + v[n;m],$$

$$n = -N_{cp}, \ldots, N-1$$

where Δf is the residual carrier frequency offset (normalized by the OFDM sampling rate), and v[n;m] is additive white Gaussian noise. The residual carrier frequency offset is due to the imperfect frequency estimation in the cell search. It will become clear later that this residual carrier frequency offset has a pronounced effect on ToA estimation.

For each OFDM symbol, the receiver discards the first $N_{cp}$ samples and performs a FFT on the remaining N samples. The received symbol on the l-th subcarrier at OFDM symbol time m is given by:

$$Y[\ell; m] = \sum_{n=0}^{N-1} y[n; m] e^{-j2\pi \frac{\ell}{N} n}$$

$$= \sum_{n=0}^{N-1} \frac{a[m]}{N} e^{j2\pi \Delta f(n+m(N+N_{cp}))}$$

$$\sum_{k} S[k; m] e^{j2\pi \frac{k}{N}(n-D)} e^{-j2\pi \frac{\ell}{N} n} + V[\ell; m]$$

$$= a[m] e^{j2\pi \Delta f m(N+N_{cp})} \sum_{k} S[k; m] e^{-j2\pi \frac{k}{N} D}$$

$$\frac{1}{N} \sum_{n=0}^{N-1} e^{j2\pi \Delta f n} e^{j2\pi \frac{k-\ell}{N} n} + V[\ell; m]$$

$$= a[m] e^{j2\pi \Delta f m(N+N_{cp})} S[\ell; m] e^{-j2\pi \frac{\ell}{N} D} \frac{1}{N} \sum_{n=0}^{N-1} e^{j2\pi \Delta f n} +$$

$$a[m] e^{j2\pi \Delta f m(N+N_{cp})} \sum_{k \neq \ell} S[k; m] e^{-j2\pi \frac{k}{N} D}$$

$$\frac{1}{N} \sum_{n=0}^{N-1} e^{j2\pi \Delta f n} e^{j2\pi \frac{k-\ell}{N} n} + v[\ell; m]$$

It can be seen that the received symbol consists of three terms: (i) the signal term, (ii) the ICI term, and (iii) the noise term. More explicitly, $$Y[\ell; m] =$$

$$a[m] e^{j\pi(N-1)\Delta f} \frac{\sin(N\pi \Delta f)}{N \sin(\pi \Delta f)} e^{j2\pi \Delta f m(N+N_{cp})} S[\ell; m] e^{-j2\pi \frac{\ell}{N} D} + ICI + \text{Noise}$$

The objective is to estimate the delay D in the presence of unknown channel gain a[m], residual carrier frequency offset Δf, ICI and noise, assuming the data symbol S[f₁m] is known. Several remarks on the signal term in the above equation are in order.

$e^{j\pi(N-1)\Delta f}$ is a constant phase shift and is not distinguishable from the complex channel gain a[m].

$$\frac{\sin(N\pi\Delta f)}{N\sin(\pi\Delta f)}$$

is real and less than 1 if Δf is not 0. So this term implies some signal power loss. The value however is close to 1 if NΔf is small, implying negligible signal power loss.

$e^{j2\pi\Delta f m(N+N_{cp})}$ varies from one OFDM symbol to another, but it is a constant phase shift within one OFDM symbol time.

$$e^{-j2\pi \frac{\ell}{N} D}$$

is a phase shift proportional to the delay as well as subcarrier index.

Based on the analysis, it can be seen there are three possible pilot designs to help the base station estimate ToA:

1) The pilots span over one OFDM symbol but multiple subcarriers. In this case, the delay D can be estimated by evaluating the phase shifts among the received symbols sent on the subcarriers. There is one caveat, however: the positions of two adjacent pilots should not be too far apart in the frequency domain; otherwise, there may be a 2 pi phase ambiguity.

2) The pilots span over multiple OFDM symbols but are restricted to use one subcarrier in each OFDM symbol. In this case, hopping over the OFDM symbols is needed to help the base station estimate the delay D. If hopping is not applied, the phase shift $$e^{-j2\pi \frac{\ell}{N} D}$$

due to the delay D is not distinguishable from the complex channel gain.

3) The pilots span over multiple OFDM symbols and also multiple subcarriers in each OFDM symbol. In this case, hopping over the OFDM symbols is not necessary from the perspective of ToA estimation. But hopping may be beneficial for other purposes, such as frequency diversity and inter-cell interference randomization.

For NPRACH, note that the transmission only uses one subcarrier at every symbol group. Denote the subcarrier index used by symbol group m as Ω(m), which is a mapping from symbol group index to the subcarrier index. The specific form of Ω(m) is determined by the adopted hopping pattern of NPRACH.

It is straightforward to extend the above result to the more general case with multiple symbols in a symbol group. With an abuse of notation, the i-th received symbol in symbol group m (after FFT at the receiver) is given by:

$$y[\ell; m] = a[m] e^{j\pi(N-1)\Delta f}$$

$$\frac{\sin(N\pi\Delta f)}{N\sin(\pi\Delta f)} e^{j2\pi\Delta f(\ell N + m(5N+N_{cp}))} u[m] e^{-j2\pi \frac{\Omega(m)}{N} D} + ICI + \text{Noise}$$

where u[m] is the symbol value of the transmitted NPRACH preamble at symbol group m.

Receiver Algorithms

Based on the results and discussions in the preliminary analysis above, this section discloses algorithms enabling a base station to detect the random access preamble and estimate the ToA. One embodiment starts with ToA estimation and then utilizes the corresponding ToA estimation statistic to determine (i.e., detect) the presence of the preamble.

ToA Estimation

A. Joint ToA and Residual CFO Estimation

Figure 5:
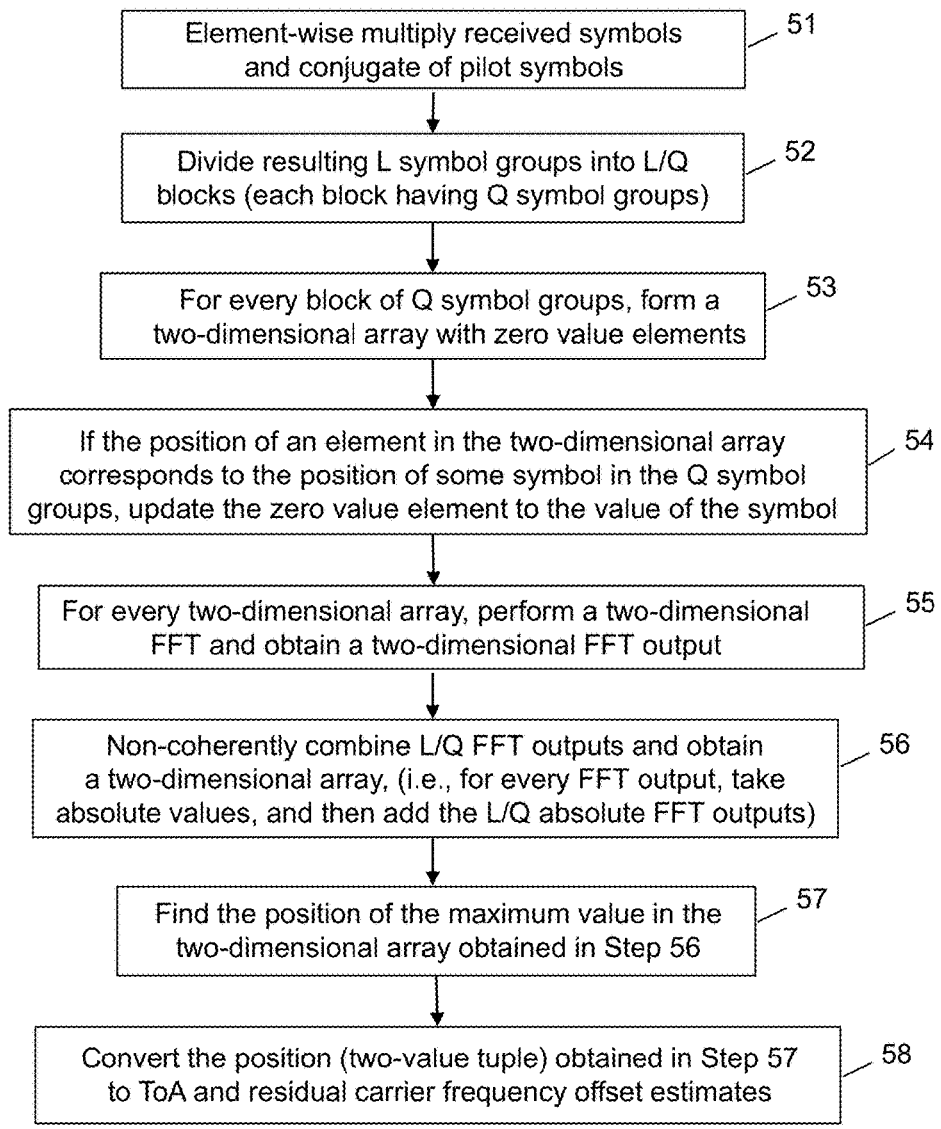
FIG. 5 is a flowchart illustrating an exemplary embodiment in which ToA and residual Carrier Frequency Offset (CFO) estimation are jointly estimated.
Figure 6:
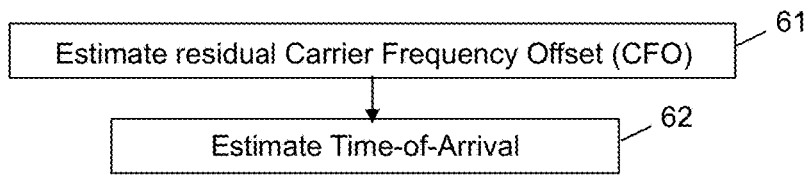
FIG. 6 is a flowchart illustrating an exemplary embodiment in which ToA and residual CFO estimation are separately estimated in a two-step process.

FIG. 5 is a flowchart illustrating an exemplary embodiment in which the ToA estimation and residual CFO estimation are jointly estimated. At step 51, the received symbols and a conjugate of pilot symbols are element-wise multiplied to create L symbol groups. At step 52, the L symbol groups are divided into L/Q blocks, each block having Q symbol groups. At step 53, for every block of Q symbol groups, a two-dimensional array is formed with zero value elements. At step 54, when the position of an element in the two-dimensional array corresponds to the position, in a two-dimensional time-frequency grid, of a symbol in the Q symbol groups, the zero value element is updated to the value of the symbol. At step 55, for every two-dimensional array, a two-dimensional FFT is performed to obtain a two-dimensional FFT output. At step 56, the L/Q two-dimensional FFT outputs are non-coherently combined to obtain a two-dimensional array. At step 57, the position of the maximum value in the two-dimensional array is found. At step 58, the position of the maximum value in the two-dimensional array is converted to the ToA and the residual CFO estimates.

The ToA and residual CFO can be jointly estimated as follows:

$$(\Delta f^*, D^*) = \arg\max_{\Delta f, D} J(\Delta f, D) = \arg\max_{\Delta f, D} \sum_{g=0}^{\frac{L}{Q}-1} J_g(\Delta f, D)$$

$$J_g(\Delta f, D) = \left| \sum_{m=gQ,\ldots,(g+1)q-1} \sum_{\ell=0,\ldots,4} y[\ell; m] u^*[m] e^{-j2\pi\Delta f(\ell N + m(5N+N_{cp}))} e^{j2\pi\frac{\Omega(m)}{N}D} \right|^2$$

The above rule of joint ToA and residual CFO estimation is intuitive. The estimate ($\Delta i^*$, $D^*$) is the one that yields the maximum correlation of the transmitted preamble symbols and the received symbols whose phase shifts due to ToA and residual CFO are corrected by the estimate. Note that the estimation rule takes the form of a two-dimensional discrete-time Fourier transform (DTFT). As a result, the search for ($\Delta f^*$, $D^*$) can be efficiently carried out in the frequency domain by utilizing the FFT.

B. Two Step ToA Estimation with Residual CFO Estimation

FIG. 6 is a flowchart illustrating an exemplary embodiment in which ToA and residual CFO estimation are separately estimated in a two-step process instead of a joint estimation of ToA and residual CFO. At step 61, residual CFO ($\Delta f^*$) is first estimated and its effect is corrected, and then the ToA $D^*$ is estimated at step 62.

1. Residual CFO Estimation: Based on the received symbols in the frequency domain, any CFO estimation algorithms that yield accurate enough estimation may be applied in this step. Three alternatives are described below.

Alternative 1: Near Maximum Likelihood Estimation of Residual CFO.

Figure 7:
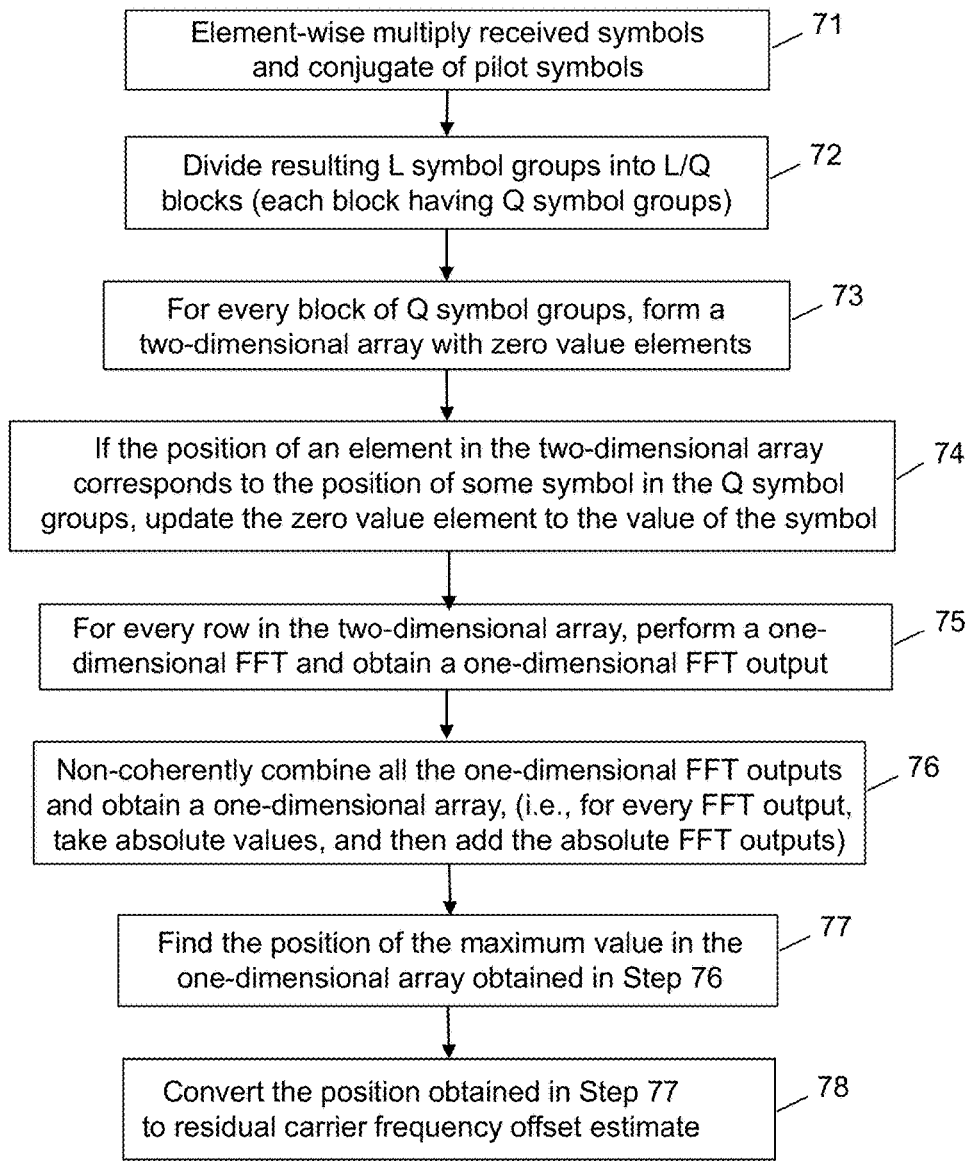
FIG. 7 is a flowchart illustrating a first exemplary embodiment for estimating residual CFO in step 61 of FIG. 6.

FIG. 7 is a flowchart illustrating a first exemplary embodiment for estimating residual CFO in step 61 of FIG. 6. At step 71, the received symbols and a conjugate of pilot symbols are element-wise multiplied to create symbol groups. At step 72, the L symbol groups are divided into L/Q blocks, each block having Q symbol groups. At step 73, for every block of Q symbol groups, a two-dimensional array is formed with zero value elements. At step 74, when the position of an element in the two-dimensional array corresponds to the position, in a two-dimensional time-frequency grid, of a symbol in the Q symbol groups, the zero value element is updated to the value of the symbol. At step 75, for every row in the two-dimensional array, a one-dimensional FFT is performed to obtain a one-dimensional FFT output. At step 76, all the one-dimensional FFT outputs are non-coherently combined to obtain a one-dimensional array. At step 77, the position of the maximum value in the one-dimensional array is found. At step 78, the position of the maximum value in the one-dimensional array is converted to the residual CFO estimate.

Note that the received symbols on the same subcarrier incur the same phase shift caused by the unknown ToA D. In other words, $$e^{j2\pi\frac{\Omega(m)}{N}D}$$

is the same for received symbols such that $\Omega(m)=k$ for some subcarrier k. As a result, an estimation statistic can be extracted from the received symbols on each subcarrier, and the estimation statistics can be non-coherently combined across different subcarriers. This estimation rule is explicitly given in the following equation:

$$\Delta f^* = \arg\max_{\Delta f} \sum_{g=0}^{\frac{L}{Q}-1} \left| \sum_{k:\Omega(m)=k} \left| \sum_{m=gQ,\ldots,(g+1)Q-1} \sum_{i=0,\ldots,4} y[\ell; m] u^*[m] e^{-j2\pi\Delta f(\ell N + m(5N+N_{cp}))} \right|^2 \right|^2$$

Note that the above estimation rule takes the form of a one-dimensional discrete-time Fourier transform (DTFT). As a result, the search for $\Delta f^*$ can be efficiently carried out in the frequency domain by utilizing an FFT.

Alternative 2: Differential Processing of Symbols in Each Symbol Group.

Figure 8:
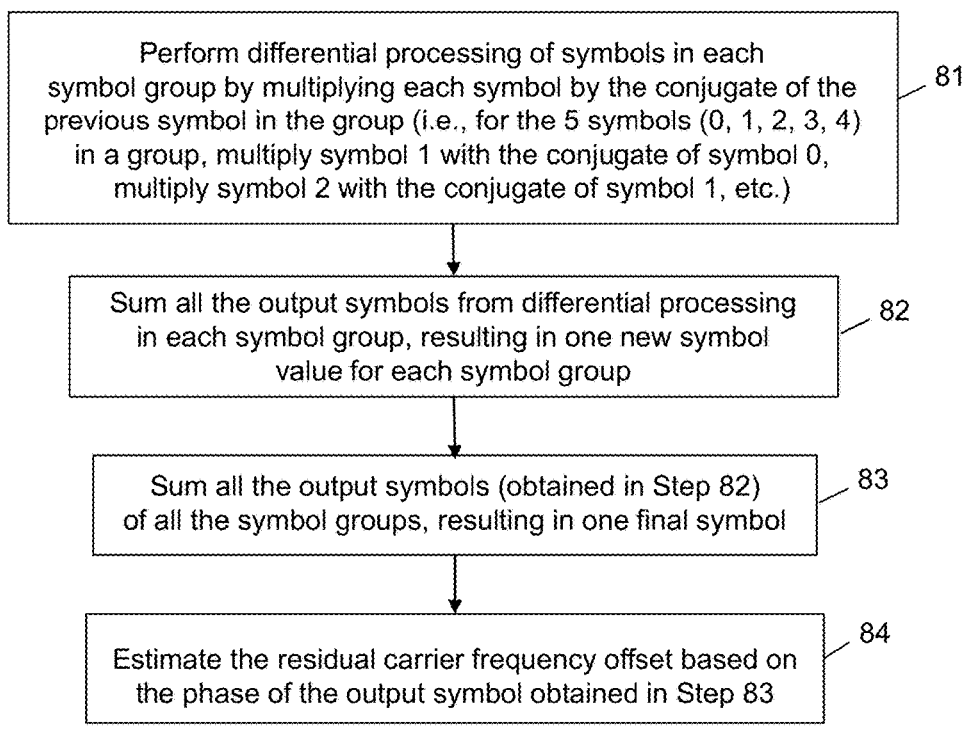
FIG. 8 is a flowchart illustrating a second exemplary embodiment for estimating residual CFO in step 61 of FIG. 6.

FIG. 8 is a flowchart illustrating a second exemplary embodiment for estimating residual CFO in step 61 of FIG. 6. At step 81, the baseband processor performs differential processing of the symbols in each symbol group, wherein beginning with symbol 1, each symbol (0, 1, 2, 3, 4) in the symbol group is multiplied by the conjugate of the previous symbol in the group to produce an output symbol. At step 82, all the output symbols from the differential processing in each symbol group are summed, resulting in a single symbol value for each symbol group. At step 83, the single symbol values for all of the symbol groups are summed to obtain a final symbol. At step 84, the residual CFO is estimated based on a phase of the final symbol.

Take symbol group m for example:

$$y^*[l;m]y[i+1;m] \sim e^{j2\pi\Delta f(5N+N_{cp})}, i=0,1,2,3$$

With this differential processing, residual CFO can be estimated easily by examining the phase shift in the frequency domain. As long as the SNR is not too low, this approach works well. This estimation approach is summarized in the following equation:

$$\Delta f^* = \frac{1}{2\pi(5N+N_{cp})} \text{phase}\left(\sum_{m=0}^{L-1}\sum_{i=0}^{3} y^*[\ell; m] y[\ell+1; m]\right)$$

Alternative 3: Utilize Frequency Hopping Mirroring.

Figure 9:
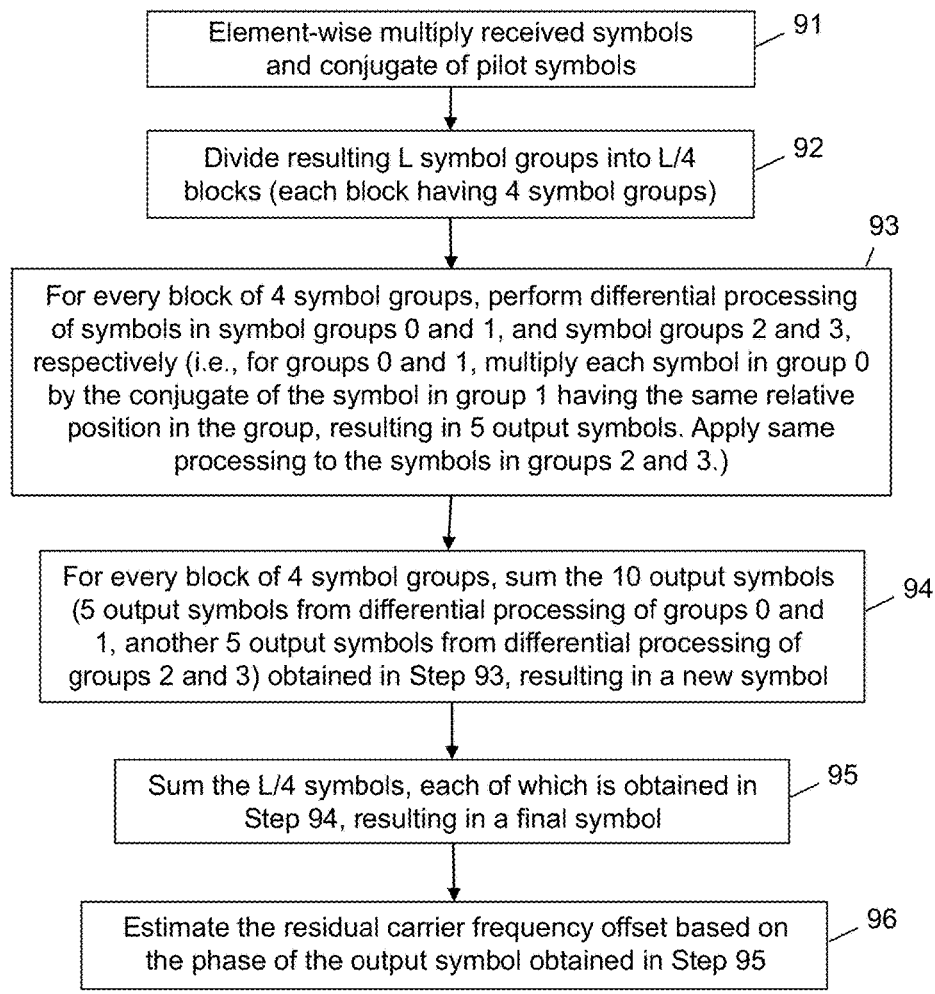
FIG. 9 is a flowchart illustrating a third exemplary embodiment for estimating residual CFO in step 61 of FIG. 6.

FIG. 9 is a flowchart illustrating a third exemplary embodiment for estimating residual CFO in step 61 of FIG. 6. At step 91, the received symbols and a conjugate of pilot symbols are element-wise multiplied to create L symbol groups. At step 92, the L symbol groups are divided into L/4 blocks, each block having four symbol groups (0, 1, 2, 3). At step 93, for every block of four symbol groups, the baseband processor performs differential processing of symbols in symbol groups 0 and 1, and symbol groups 2 and 3, respectively. Each symbol in group 0 is multiplied by the conjugate of the symbol in group 1 having the same relative position in the group to produce an output symbol, and each symbol in group 2 is multiplied by the conjugate of the symbol in group 3 having the same relative position in the group to produce an output symbol. At step 94, for every block of four symbol groups, the output symbols obtained from the differential processing are summed, resulting in a new symbol. At step 95, the L/4 new symbols obtained by summing the output symbols are summed, resulting in a final symbol. At step 96, the residual CFO is estimated based on a phase of the final symbol.

Note that the two single-subcarrier hoppings in a 4-symbol group are mirrored, i.e., if the first single-tone hopping (between symbol groups 0 and 1) is "UP", the second single-tone hopping (between symbol groups 2 and 3) is "DOWN", and vice versa. Therefore, it is possible to utilize this mirroring to cancel the effect of phase shifts due to unknown ToA. Take symbol group 0, 1, 2, and 3 for example. If the hopping is DOWN-UP, then:

$$(y[i; 0]u^*[0])^* y[i; 1]u^*[1] \sim e^{j2\pi\Delta f(5N+N_{cp})} e^{-j2\pi\frac{D}{N}}$$

$$(y[i; 2]u^*[2])^* y[i; 3]u^*[3] \sim e^{j2\pi\Delta f(5N+N_{cp})} e^{j2\pi\frac{D}{N}}$$

If the hopping is UP-DOWN, then:

$$(y[i; 0]u^*[0])^* y[i; 1]u^*[1] \sim e^{j2\pi\Delta f(5N+N_{cp})} e^{j2\pi\frac{D}{N}}$$

$$(y[i; 2]u^*[2])^* y[i; 3]u^*[3] \sim e^{j2\pi\Delta f(5N+N_{cp})} e^{-j2\pi\frac{D}{N}}$$

In both cases, if the two equations are added, then:

$$(y[i; 0]u^*[0])^* y[i; 1]u^*[1] +$$
$$(y[i; 2]u^*[2])^* y[i; 3]u^*[3] \sim e^{j2\pi\Delta f(5N+N_{cp})} 2\cos\left(2\pi\frac{D}{N}\right)$$

It can be seen that the phase shifts caused by the unknown ToA D cancel and thus residual carrier frequency offset can be estimated accordingly. This approach works best when D is much smaller than N (e.g., D is not larger than N/8). If D is close to N, the cancellation of phase shifts due to ToA may be too coarse and consequently the phase shift due to residual CFO may be imbedded in the phase noise of cancellation, leading to an inaccurate residual CFO estimate. This estimation approach is summarized in the following equation:

$$\Delta f^* = \frac{1}{2\pi(5N+N_{cp})} \text{phase}\left(\sum_{r=0}^{\frac{L}{4}-1} \sum_{i=0}^{4} (y[i; 4r]u^*[4r])^* y[i; 4r+1]u^*[4r+1] + (y[i; 4r+2]u^*[4r+2])^* y[i; 4r+3]u^*[4r+3]\right)$$

where r denotes the r-th repetition of every four symbol groups.

2. ToA Estimation: Two alternatives are described below.

Alternative 1: Direct Search for ToA.

FIG. 10 is a flowchart illustrating a first exemplary embodiment for estimating ToA in step 62 of FIG. 6. At step 101, the received symbols and a conjugate of pilot symbols are element-wise multiplied to create L symbol groups. At step 102, a phase shift is corrected using the residual CFO estimate. At step 103, the L symbol groups are divided into L/Q blocks, each block having Q symbol groups. At step 104, a search is performed to find a ToA value that yields a maximum statistic, which is a summation of absolute values of the statistics from the L/Q blocks.

With the estimated residual CFO, the phase shift due to residual CFO can be corrected as follows:

$$w[l; m] = y[l; m]u^*[m]e^{-j2\pi\Delta f^*(iN+m(5N+N_{cp}))}$$

Then ToA can be estimated by searching over the feasible range:

$$D^* = \arg\max_D \sum_{g=0}^{\frac{L}{Q}-1} \left| \sum_{m=gQ,\ldots,(g+1)Q-1} e^{j2\pi\frac{\Omega(m)}{N}D} \sum_{i=0,\ldots,4} w[i; m] \right|^2$$

Alternative 2: Coarse+Fine Timing Estimate.

FIG. 11 is a flowchart illustrating a second exemplary embodiment for estimating ToA in step 62 of FIG. 6. At step 111, a coarse timing estimate is determined based on 1-tone hopping. At step 112, a fine timing estimate is determined based on 6-tone and/or random hopping.

a. Coarse ToA Estimation Based on 1-Tone Hopping.

Figure 12:
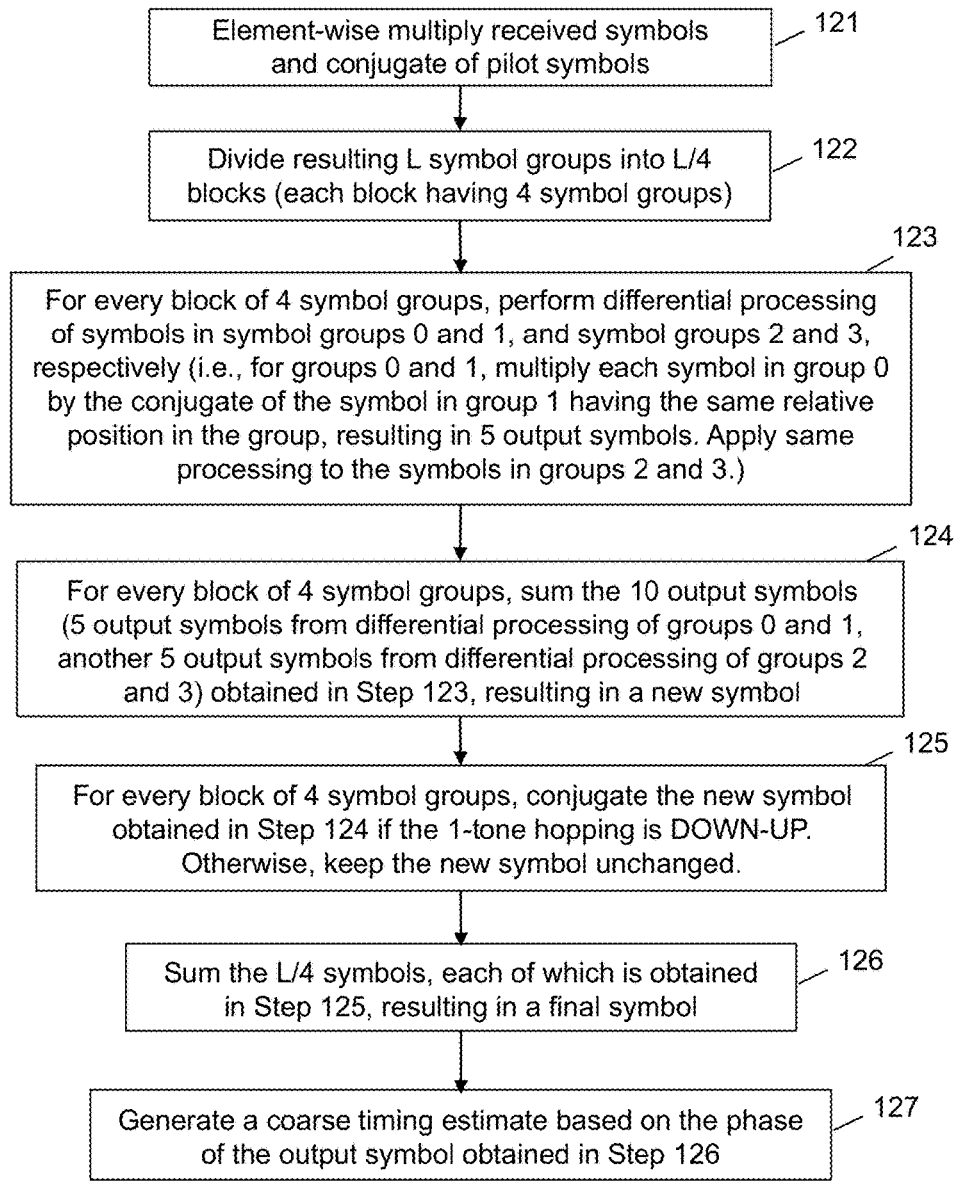
FIG. 12 is a flowchart illustrating an exemplary embodiment for determining a coarse timing estimate in step 111 of FIG. 11.

FIG. 12 is a flowchart illustrating an exemplary embodiment for determining a coarse timing estimate in step 111 of FIG. 11. At step 121, the received symbols and a conjugate of pilot symbols are element-wise multiplied to create L symbol groups. At step 122, the L symbol groups are divided into L/4 blocks, each block having four symbol groups (0, 1, 2, 3). At step 123, for every block of four symbol groups, the baseband processor performs differential processing of symbols in symbol groups 0 and 1, and symbol groups 2 and 3, respectively. Each symbol in group 0 is multiplied by the conjugate of the symbol in group 1 having the same relative position in the group to produce an output symbol, and each symbol in group 2 is multiplied by the conjugate of the symbol in group 3 having the same relative position in the group to produce an output symbol. At step 124, for every block of four symbol groups, the output symbols obtained from the differential processing are summed, resulting in a new symbol. At step 125, for every block of four symbol groups, the new symbol is conjugated when the 1-tone hopping is DOWN-UP, otherwise the symbol is kept unchanged. The 1-tone hopping is defined as DOWN-UP when a tone index decreases from symbol group 0 to symbol group 1 due to hopping, and the tone index increases from symbol group 2 to symbol group 3 due to hopping. At step 126, the L/4 symbols are summed after conjugating, resulting in a final symbol. At step 127, the coarse timing estimate is generated based on a phase of the final symbol.

Note that the 1-tone hopping in NPRACH frequency hopping enables a large ToA estimation range (and thus supports large cell size). The coarse ToA estimation can be performed based on the 1-tone hopping. Further note that the two single-subcarrier hoppings are mirrored, i.e., if the first hopping is "UP", the second hopping is "DOWN", and vice versa. Therefore, it is possible to utilize this mirroring to cancel the effect of residual CFO in the coarse timing estimate. In other words, the residual CFO estimate performed in Step 1 does not need to be invoked for this coarse timing estimate. Take symbol group 0, 1, 2, and 3 for example. If the hopping is DOWN-UP, then:

$$(y[i;0]u^*[0])^*y[i;1]u^*[1] \sim e^{j2\pi\Delta f(5N+N_{cp})}e^{j2\pi\frac{D}{N}}$$

$$(y[i;2]u^*[2])^*y[i;3]u^*[3] \sim e^{j2\pi\Delta f(5N+N_{cp})}e^{-j2\pi\frac{D}{N}}$$

Therefore, $$(y[i;0]u^*[0])^*y[i;1]u^*[1] +$$

$$((y[i;2]u^*[2])^*y[i;3]u^*[3])^* \sim e^{j2\pi\frac{D}{N}}2\cos(2\pi\Delta f(5N+N_{cp}))$$

If the hopping is UP-DOWN, then $$(y[i;0]u^*[0])^*y[i;1]u^*[1] \sim e^{j2\pi\Delta f(5N+N_{cp})}e^{-j2\pi\frac{D}{N}}$$

$$(y[i;2]u^*[2])^*y[i;3]u^*[3] \sim e^{j2\pi\Delta f(5N+N_{cp})}e^{j2\pi\frac{D}{N}}$$

Therefore, $$(y[i;0]u^*[0])^*y[i;1]u^*[1] +$$

$$((y[i;2]u^*[2])^*y[i;3]u^*[3])^* \sim e^{-j2\pi\frac{D}{N}}2\cos(2\pi\Delta f(5N+N_{cp}))$$

It can be seen that the phase shifts caused by the residual CFO cancel and thus ToA can be estimated accordingly in the phase domain. This estimation approach is summarized in the following equation:

$$D^*_{coarse} = \frac{N}{2\pi}\text{phase}$$

$$\left(\sum_{r=0}^{\frac{L}{4}-1}\sum_{i=0}^{4}(A[i,r]I_{UP-DOWN\,in\,repetition\,r} + A^*[i,r]I_{DOWN-UP\,in\,repetition\,r})\right)$$

where $$A[i,r] = (y[i;4r]u^*[4r])^*y[i;4r+1]u^*[4r+1] +$$

$$(y[i;4r+2]u^*[4r+2])^*y[i;4r+3]u^*[4r+3]$$

b. Fine ToA Estimation Based on 6-Tone Hopping and/or Pseudo-Random Hopping.

Figure 13:
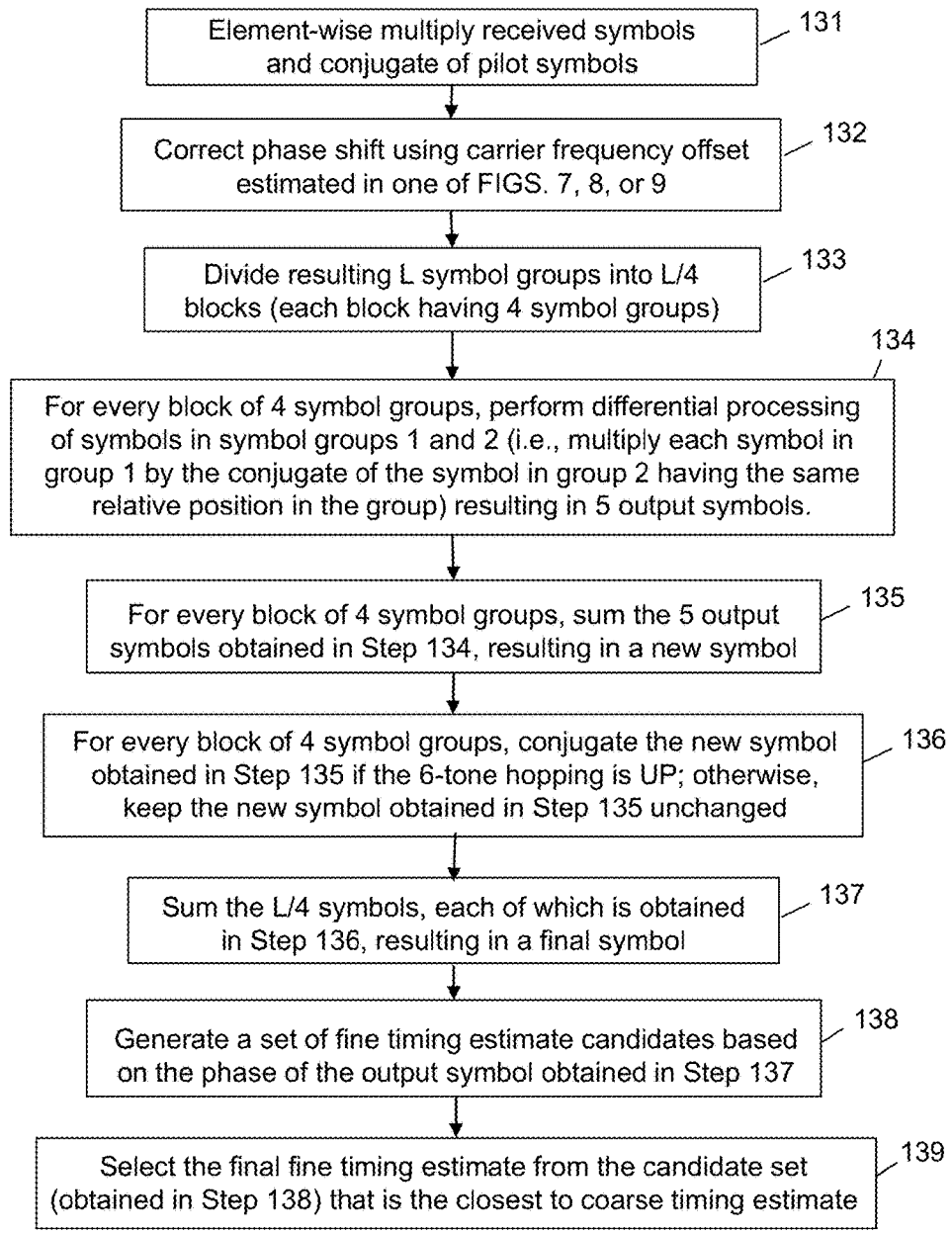
FIG. 13 is a flowchart illustrating a first exemplary embodiment for determining a fine timing estimate in step 112 of FIG. 11.

FIG. 13 is a flowchart illustrating a first exemplary embodiment for determining a fine timing estimate in step 112 of FIG. 11. The coarse timing estimate can be refined by utilizing larger hopping distances in NPRACH that include both 6-tone hopping and pseudo-random hopping. This exemplary embodiment is only based on 6-tone hopping. To this end, the residual CFO estimated in Step 1 is first utilized to correct the phase shift due to residual CFO.

At step 131, the received symbols and a conjugate of pilot symbols are element-wise multiplied to create L symbol groups. At step 132, the phase shift is corrected using the residual CFO estimate. At step 133, the L symbol groups are divided into L/4 blocks, each block having four symbol groups (0, 1, 2, 3). At step 134, for every block of four symbol groups, the baseband processor performs differential processing of symbols in symbol groups 1 and 2, wherein each symbol in group 1 is multiplied by the conjugate of the symbol in group 2 having the same relative position in the group to produce an output symbol. At step 135, for every block of four symbol groups, the output symbols obtained from the differential processing are summed, resulting in a new symbol. At step 136, for every block of four symbol groups, the new symbol is conjugated when the 6-tone hopping is UP, otherwise keeping the symbol unchanged. The 6-tone hopping is defined as UP when a tone index increases from symbol group 1 to symbol group 2 due to hopping. At step 137, the L/4 symbols are summed after conjugating, resulting in a final symbol. At step 138, a set of fine timing estimate candidates is generated based on a phase of the final symbol. At step 139, the fine timing estimate is selected from the candidate set that is closest to the coarse timing estimate.

The residual CFO estimate may be utilized to correct the phase shift as follows:

$$w[l;m] = y[l;m]u^*[m]e^{-j2\pi\Delta f^*(lN+m(sN+N_{sp}))}$$

Take symbol group 1 and 2 for example. If the 6-tone hopping is DOWN, then:

$$(w[i;1])^*(w[i;2]) \sim e^{j2\pi\frac{6D}{N}}$$

If the 6-tone hopping is UP, then:

$$(w[i;1])^*(w[i;2]) \sim e^{-j2\pi\frac{6D}{N}}$$

It can be seen that the ToA can be estimated accordingly in the phase domain. This estimation approach is summarized in the following equation:

$$D^*_{fine}(n) = \frac{N}{2\pi}\left(2n\pi + \text{phase}\left(\sum_{r=0}^{\frac{L}{4}-1}B[r]\right)\right), n = 0, \ldots, M-1$$

where $$B[r] = \begin{cases} \sum_{i=0}^{4}(w[l;4r+1])^*(w[l;4r+2]), & 6\text{-tone hopping is DOWN} \\ \sum_{i=0}^{4}(w[l;4r+2])^*(w[l;4r+1]), & 6\text{-tone hopping is UP} \end{cases}$$

Note that the above fine estimate results in a set of M fine estimates. The choice of M depends on cell size (i.e., the ToA estimation range). For example, with 35 km cell size, due to 2*Pi phase ambiguity, there may be 6 fine timing estimate candidates from 6-tone hopping, and thus M=6.

Note that it is also possible to further use symbol group 0 and 3 for refining timing estimate, whose hopping distance is also 6 tones. Symbol group 0 and 3 are however more distant in the time domain and thus their utilization is more sensitive to Doppler and remaining CFO after residual CFO correction. Therefore, it is a tradeoff between energy gain and robustness to Doppler and remaining CFO. If Symbol group 0 and 3 is utilized, the definition of B[r] can be changed to the following:

$$B[r] = \begin{cases} \sum_{i=0}^{4} \begin{array}{l}(w[\ell; 4r+1])^*w[\ell; 4r+2] + \\ (w[\ell; 4r])^*w[\ell; 4r+3]\end{array}, & \text{6 – tone hopping is DOWN} \\ \sum_{i=0}^{4} \begin{array}{l}(w[\ell; 4r+2])^*w[\ell; 4r+1] + \\ (w[\ell; 4r+3])^*w[\ell; 4r]\end{array}, & \text{6 – tone hopping is UP} \end{cases}$$

The final timing estimate can be chosen as follows:

$$D^* = \arg\min_n |D^*_{fine}(n) - D^*_{coarse}|$$

Figure 14:
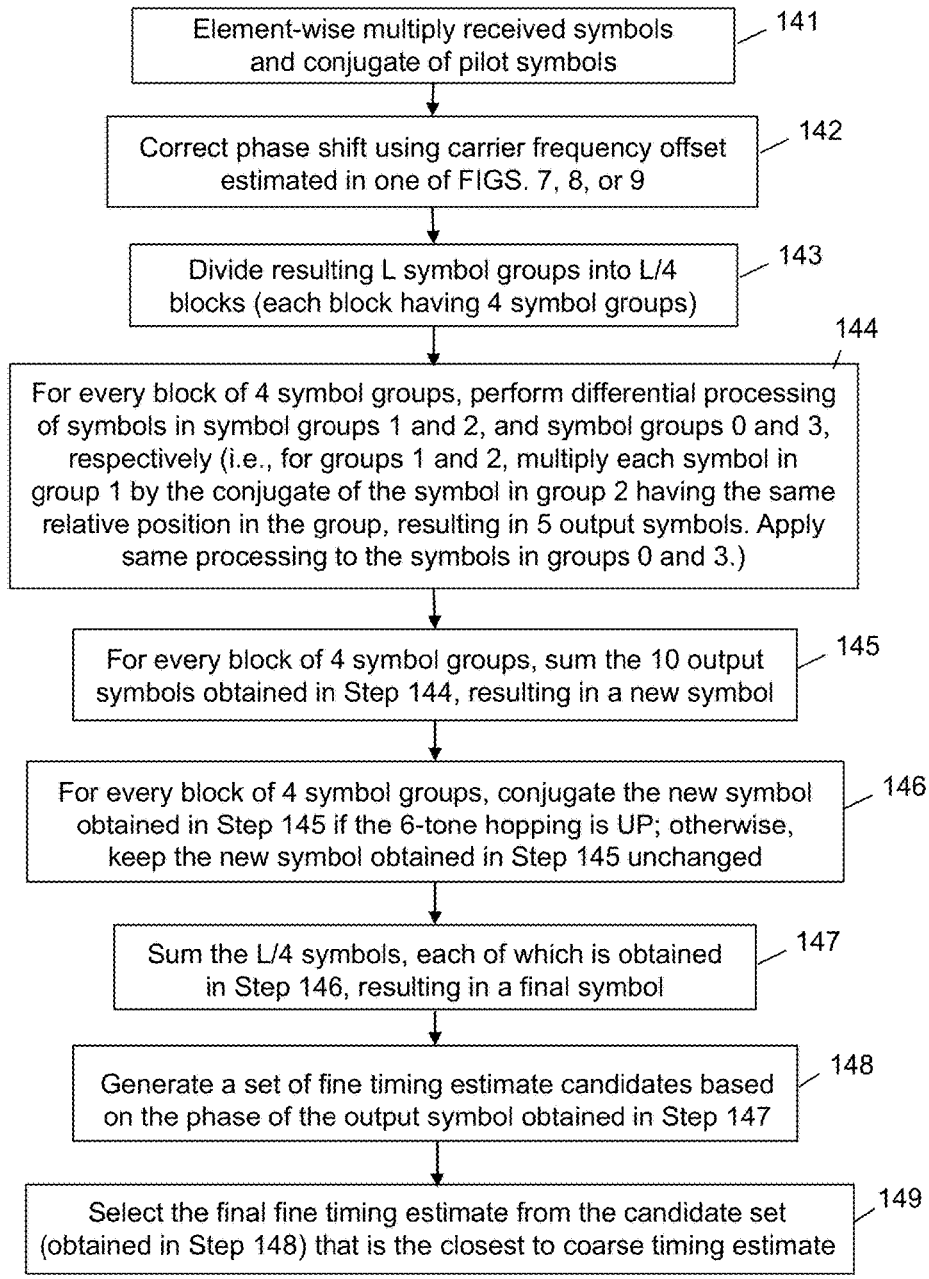
FIG. 14 is a flowchart illustrating a second exemplary embodiment for determining a fine timing estimate in step 112 of FIG. 11.

FIG. 14 is a flowchart illustrating a second exemplary embodiment for determining a fine timing estimate in step 112 of FIG. 11. At step 141, the received symbols and a conjugate of pilot symbols are element-wise multiplied to create L symbol groups. At step 142, the phase shift is corrected using the residual CFO estimate. At step 143, the L symbol groups are divided into L/4 blocks, each block having four symbol groups (0, 1, 2, 3). At step 144, for every block of four symbol groups, the baseband processor performs differential processing of symbols in symbol groups 1 and 2, and symbol groups 0 and 3, respectively. Each symbol in group 1 is multiplied by the conjugate of the symbol in group 2 having the same relative position in the group, and each symbol in group 0 is multiplied by the conjugate of the symbol in group 3 having the same relative position in the group to produce output symbols. At step 145, for every block of four symbol groups, the output symbols obtained from the differential processing are summed, resulting in a new symbol. At step 146, for every block of four symbol groups, the new symbol is conjugated when the 6-tone hopping is UP, otherwise the symbol is kept unchanged. The 6-tone hopping is defined as UP when a tone index increases from symbol group 1 to symbol group 2 due to hopping, wherein when the 6-tone hopping is UP for symbol groups 1 and 2, the hopping is also UP for symbol groups 0 and 3. At step 147, the L/4 symbols are summed after conjugating, resulting in a final symbol. At step 148, a set of fine timing estimate candidates is generated based on a phase of the final symbol. At step 149, the fine timing estimate from the candidate set is selected that is closest to the coarse timing estimate.

NPRACH Detection

With the estimate ($\Delta f^*$, $D^*$) obtained as described above, the presence of the preamble can be determined. In one embodiment, a threshold-based approach may be utilized for the detection of NPRACH in NB-IoT. One possible choice of the statistic used to compare against the detection threshold is $J(\Delta f^*, D^*)$. For the two-step approach, $J(\Delta f^*, D^*)$ is not readily available. But it can be calculated based on the estimates of residual CFO and ToA. Alternatively, any reasonable statistic obtained along the estimation may be used for this purpose. For simplicity, the same notation "$J(\Delta f^*, D^*)$" is utilized to refer to any of these possible metrics.

Two error events may arise with this threshold-based preamble detection:
1. Miss detection (i.e., false negative): The random access preamble is present, but the statistic $J(\Delta f^*, D^*)$ does not exceed the detection threshold.
2. False alarm (i.e., false positive): The random access preamble is absent, but the statistic $J(\Delta f^*, D^*)$ exceeds the detection threshold.

Clearly, there exists a trade-off in setting the detection threshold. Increasing the detection threshold lowers the false alarm rate at the cost of increased likelihood of miss detection. For random access preamble detection in cellular systems, the detection threshold is usually chosen such that the false alarm rate is below some target. With the detection threshold selected, the systems can measure the miss detection probability.

The detection threshold may be set according to a noise power estimate. Alternatively, the detection threshold is not set dependent on the noise power estimate, but the detection metric $J(\Delta f^*, D^*)$ is normalized according to a noise power estimate.

Figure 15:
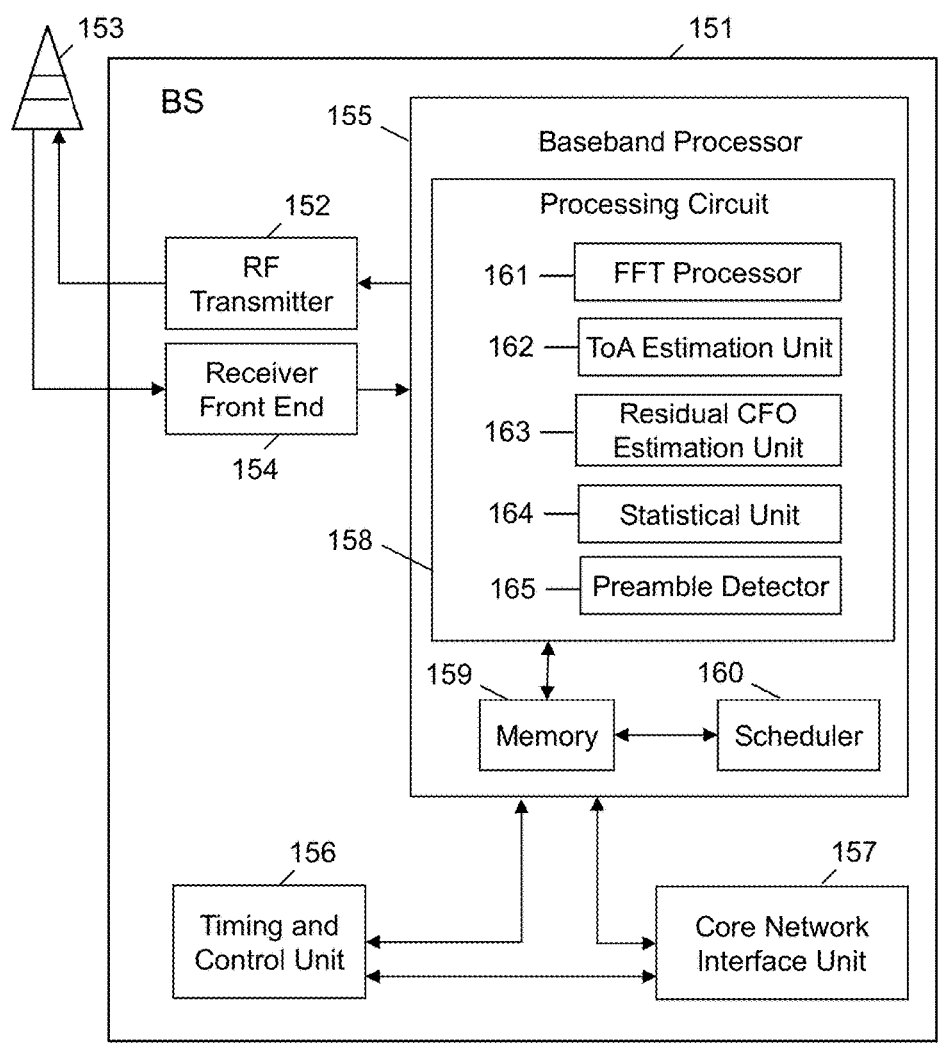
FIG. 15 is a simplified block diagram of a baseband processor of a receiver in an exemplary embodiment of the present disclosure.

FIG. 15 is a simplified block diagram of a baseband processor of a receiver in an exemplary embodiment of the present disclosure. A radio network node such as a base station 151 is shown to include an RF transmitter 152, which utilizes an antenna system 153 to transmit downlink signals and data to UEs. A receiver front end 154 receives uplink radio signals and data from the UE's through the antenna system and provides the signals to a baseband processor 155. The base station may also include a timing and control unit 156 and a core network interface unit 157.

The baseband processor 155 may include a processing circuit 158, a memory 159, and a scheduler 160. The memory may store computer program instructions that, when executed by the processing circuit, implement the algorithms described above. To that end, the processing circuit may include an FFT processor 161, a ToA estimation unit 162, a residual CFO estimation unit 163, a statistical unit 164 configured to calculate the preamble detection statistic, and a preamble detector 165 configured to compare the statistic to the preamble detection threshold.

It should be noted that the above-mentioned embodiments illustrate rather than limit the invention, and that those skilled in the art will be able to design many alternative embodiments without departing from the scope of the appended claims. Any reference signs in the claims shall not be construed so as to limit their scope.

The invention claimed is:

1. A method in a baseband processor of a receiver for performing preamble detection and time-of-arrival, ToA, estimation for a single-tone frequency hopping random access preamble, said method comprising:
    Fast Fourier Transform, FFT, processing a received signal and identifying logical tones; and
    for each logical tone:
        reading received symbols;
        determining a ToA estimate and a residual Carrier Frequency Offset, CFO, estimate;
        forming a statistic based on the ToA estimate and the residual CFO estimate;
        comparing the statistic to a preamble threshold; and
        when the statistic is greater than or equal to the threshold, determining a preamble is present and utilizing, by the baseband processor of the receiver, the ToA estimate for a timing advance command.

2. The method according to claim 1, further comprising determining the preamble is not present and discarding the ToA estimate when the statistic is less than the threshold.

3. The method according to claim 1, wherein the random access preamble is transmitted on a Narrowband Internet of Things, NB-IoT, Physical Random Access Channel, NPRACH.

4. The method according to claim 1, wherein determining a ToA estimate includes jointly determining the ToA estimate and the residual CFO estimate.

5. The method according to claim 4, wherein jointly determining the ToA estimate and the residual CFO estimate includes:
- element-wise multiplying the received symbols and a conjugate of pilot symbols to create L symbol groups;
- dividing the L symbol groups into L/Q blocks, each block having Q symbol groups;
- for every block of Q symbol groups, forming a two-dimensional array with zero value elements;
- when the position of an element in the two-dimensional array corresponds to the position, in a two-dimensional time-frequency grid, of a symbol in the Q symbol groups, updating the zero value element to the value of the symbol;
- for every two-dimensional array, performing a two-dimensional FFT to obtain a two-dimensional FFT output;
- non-coherently combining L/Q two-dimensional FFT outputs to obtain a two-dimensional array;
- finding the position of the maximum value in the two-dimensional array; and
- converting the position of the maximum value in the two-dimensional array to the ToA and the residual CFO estimates.

6. The method according to claim 1, wherein determining a ToA estimate and a residual CFO estimate includes separately determining a residual CFO estimate and then determining the ToA estimate.

7. The method according to claim 6, wherein determining the residual CFO estimate includes:
- element-wise multiplying received symbols and a conjugate of pilot symbols to create L symbol groups;
- dividing the L symbol groups into L/Q blocks, each block having Q symbol groups;
- for every block of Q symbol groups, forming a two-dimensional array with zero value elements;
- when the position of an element in the two-dimensional array corresponds to the position, in a two-dimensional time-frequency grid, of a symbol in the Q symbol groups, updating the zero value element to the value of the symbol;
- for every row in the two-dimensional array, performing a one-dimensional FFT to obtain a one-dimensional FFT output;
- non-coherently combining all the one-dimensional FFT outputs to obtain a one-dimensional array;
- finding the position of the maximum value in the one-dimensional array; and
- converting the position of the maximum value in the one-dimensional array to the residual CFO estimate.

8. The method according to claim 6, wherein determining the residual CFO estimate includes:
- performing differential processing of the symbols 0, 1, 2, 3, 4 in each symbol group, wherein beginning with symbol 1, each symbol in the symbol group is multiplied by the conjugate of the previous symbol in the group to produce an output symbol;
- summing all the output symbols from the differential processing in each symbol group, resulting in a single symbol value for each symbol group;
- summing the single symbol values for all of the symbol groups to obtain a final symbol; and
- estimating the residual CFO based on a phase of the final symbol.

9. The method according to claim 6, wherein determining the residual CFO estimate includes:
- element-wise multiplying received symbols and a conjugate of pilot symbols to create L symbol groups;
- dividing the L symbol groups into L/4 blocks, each block having four symbol groups (0, 1, 2, 3);
- for every block of four symbol groups, performing differential processing of symbols in symbol groups 0 and 1, and symbol groups 2 and 3, respectively, wherein each symbol in group 0 is multiplied by the conjugate of the symbol in group 1 having the same relative position in the group to produce an output symbol, and each symbol in group 2 is multiplied by the conjugate of the symbol in group 3 having the same relative position in the group to produce an output symbol;
- for every block of four symbol groups, summing the output symbols obtained from the differential processing, resulting in a new symbol;
- summing the L/4 new symbols obtained by summing the products, resulting in a final symbol; and
- estimating the residual CFO based on a phase of the final symbol.

10. The method according to claim 6, wherein determining the ToA estimate includes:
- element-wise multiplying received symbols and a conjugate of pilot symbols to create L symbol groups;
- correcting a phase shift using the residual CFO estimate;
- dividing the L symbol groups into L/Q blocks, each block having Q symbol groups; and
- searching for a ToA value that yields a maximum statistic, which is a summation of absolute values of the statistics from the L/Q blocks.

11. The method according to claim 6, wherein determining the ToA estimate includes:
- determining a coarse timing estimate based on 1-tone hopping; and
- determining a fine timing estimate based on 6-tone and/or random hopping.

12. The method according to claim 11, wherein determining the coarse timing estimate includes:
- element-wise multiplying received symbols and a conjugate of pilot symbols to create L symbol groups;
- dividing the L symbol groups into L/4 blocks, each block having four symbol groups (0, 1, 2, 3);
- for every block of four symbol groups, performing differential processing of symbols in symbol groups 0 and 1, and symbol groups 2 and 3, respectively, wherein each symbol in group 0 is multiplied by the conjugate of the symbol in group 1 having the same relative position in the group to produce an output symbol, and each symbol in group 2 is multiplied by the conjugate of the symbol in group 3 having the same relative position in the group to produce an output symbol;
- for every block of four symbol groups, summing the output symbols obtained from the differential processing, resulting in a new symbol;
- for every block of four symbol groups, conjugating the new symbol when the 1-tone hopping is DOWN-UP, otherwise keeping the symbol unchanged, wherein the 1-tone hopping is DOWN-UP when a tone index decreases from symbol group 0 to symbol group 1 due to hopping, and the tone index increases from symbol group 2 to symbol group 3 due to hopping;
- summing the L/4 symbols after conjugating, resulting in a final symbol; and
- generating the coarse timing estimate based on a phase of the final symbol.

13. The method according to claim 11, wherein determining the fine timing estimate includes:

element-wise multiplying received symbols and a conjugate of pilot symbols to create L symbol groups;
correcting a phase shift using the residual CFO estimate;
dividing the L symbol groups into L/4 blocks, each block having four symbol groups (0, 1, 2, 3);
for every block of four symbol groups, performing differential processing of symbols in symbol groups 1 and 2, wherein each symbol in group 1 is multiplied by the conjugate of the symbol in group 2 having the same relative position in the group to produce an output symbol;
for every block of four symbol groups, summing the output symbols obtained from the differential processing, resulting in a new symbol;
for every block of four symbol groups, conjugating the new symbol when the 6-tone hopping is UP, otherwise keeping the symbol unchanged, wherein the 6-tone hopping is UP when a tone index increases from symbol group 1 to symbol group 2 due to hopping;
summing the L/4 symbols after conjugating, resulting in a final symbol;
generating a set of fine timing estimate candidates based on a phase of the final symbol; and
selecting the fine timing estimate from the candidate set that is closest to the coarse timing estimate.

14. The method according to claim 11, wherein determining the fine timing estimate includes:
element-wise multiplying received symbols and a conjugate of pilot symbols to create L symbol groups;
correcting a phase shift using the residual CFO estimate;
dividing the L symbol groups into L/4 blocks, each block having four symbol groups (0, 1, 2, 3);
for every block of four symbol groups, performing differential processing of symbols in symbol groups 1 and 2, and symbol groups 0 and 3, respectively, wherein each symbol in group 1 is multiplied by the conjugate of the symbol in group 2 having the same relative position in the group to produce an output symbol, and each symbol in group 0 is multiplied by the conjugate of the symbol in group 3 having the same relative position in the group to produce an output symbol;
for every block of four symbol groups, summing the output symbols obtained from the differential processing, resulting in a new symbol;
for every block of four symbol groups, conjugating the new symbol when the 6-tone hopping is UP, otherwise keeping the symbol unchanged, wherein the 6-tone hopping is UP when a tone index increases from symbol group 1 to symbol group 2 due to hopping, wherein when the 6-tone hopping is UP for symbol groups 1 and 2, the hopping is also UP for symbol groups 0 and 3;
summing the L/4 symbols after conjugating, resulting in a final symbol;
generating a set of fine timing estimate candidates based on a phase of the final symbol; and
selecting the fine timing estimate from the candidate set that is closest to the coarse timing estimate.

15. The method according to claim 1, wherein forming a statistic based on the ToA estimate includes:
obtaining maximum statistics while extracting time or frequency estimates during TOA estimation; and
selecting a statistic that yields the maximum correlation of transmitted preamble symbols and received symbols whose phase shifts due to ToA are corrected by the TOA estimate.

16. A receiver for performing preamble detection and time-of-arrival, ToA, estimation for a single-tone frequency hopping random access preamble, said receiver comprising:
a receiver front end for receiving a radio frequency, RF, signal; and
a baseband processor for processing the received RF signal, wherein the baseband processor includes a processing circuit configured to:
Fast Fourier Transform, FFT, process the received signal and identify logical tones; and
for each logical tone:
read received symbols;
determine a ToA estimate and a residual Carrier Frequency Offset, CFO, estimate;
form a statistic based on the ToA estimate and the residual CFO estimate;
compare the statistic to a preamble threshold; and
when the statistic is greater than or equal to the threshold, determine a preamble is present and utilize the ToA estimate for a timing advance command.

17. The receiver according to claim 16, wherein the processing circuit is also configured to determine the preamble is not present and to discard the ToA estimate when the statistic is less than the threshold.

18. The receiver according to claim 16, wherein the random access preamble is transmitted on a Narrowband Internet of Things, NB-IoT, Physical Random Access Channel, NPRACH.

19. The receiver according to claim 16, wherein the processing circuit includes a ToA estimation unit configured to jointly determine the ToA estimate and the residual CFO estimate.

20. The receiver according to claim 16, wherein the processing circuit includes a residual CFO estimation unit and a ToA estimation unit, wherein the residual CFO estimation unit and the ToA estimation unit are configured to separately determine the residual CFO estimate and then determine the ToA estimate.

21. The receiver according to claim 20, wherein the ToA estimation unit is configured to determine the ToA by performing a direct search based on a maximum likelihood rule, wherein the ToA estimation unit is configured to:
element-wise multiply received symbols and a conjugate of pilot symbols to create L symbol groups;
correct a phase shift using the residual CFO estimate;
divide the L symbol groups into L/Q blocks, each block having Q symbol groups; and
search for a ToA value that yields a maximum statistic, which is a summation of absolute values of the statistics from the L/Q blocks.

22. The receiver according to claim 20, wherein the ToA estimation unit is configured to determine the ToA by determining a coarse timing estimate and then determining a fine timing estimate.

23. The receiver according to claim 22, wherein the ToA estimation unit is configured to determine the coarse timing estimate based on 1-tone hopping, and determine the fine timing estimate based on 6-tone and/or random hopping.

24. The receiver according to claim 23, wherein the ToA estimation unit is configured to determine the fine timing estimate by:
generating a set of fine timing estimate candidates; and
selecting from the candidate set, the fine timing estimate that is closest to the coarse timing estimate.

* * * * *